United States Patent [19]

Hoppie et al.

[11] Patent Number: 4,478,777

[45] Date of Patent: Oct. 23, 1984

[54] METHOD FOR MAKING AN ELASTOMERIC MEMBER WITH END PIECES

[75] Inventors: Lyle O. Hoppie, Birmingham; Joseph H. McNinch, Jr.; Gregory C. Nowell, both of Livonia, all of Mich.

[73] Assignee: Eaton Corporation, Cleveland, Ohio

[21] Appl. No.: 469,617

[22] Filed: Feb. 25, 1983

[51] Int. Cl.³ .................. B29C 11/00; B29C 5/01
[52] U.S. Cl. .................... 264/102; 264/249; 264/261; 264/273; 264/347; 267/153
[58] Field of Search ........... 264/102, 259, 261, 262, 264/279, 334, 347, 271.1, 273, 249, 261, 274; 425/111, 112, 117, 127, 383, 398, 388, 384, 405 R, 406, DIG. 60

[56] References Cited

U.S. PATENT DOCUMENTS

| | | | |
|---|---|---|---|
| 1,682,691 | 8/1928 | Temple | 249/183 |
| 1,943,370 | 1/1934 | Cornet | 267/63 R |
| 2,241,125 | 5/1941 | Girard | 249/183 |
| 2,682,082 | 6/1954 | Gehman et al. | 264/347 |
| 2,743,102 | 4/1956 | Seddon et al. | 267/63 R |
| 3,329,588 | 7/1967 | Mears | 249/183 |
| 3,405,201 | 10/1968 | Roach | 425/DIG. 60 |
| 3,526,688 | 9/1970 | Shelton et al. | 264/102 |
| 3,784,343 | 1/1974 | Iwasaki | 425/352 |
| 3,797,986 | 3/1974 | Onder | 425/352 |
| 3,804,395 | 4/1974 | Muller | 267/140 |
| 4,246,988 | 1/1981 | Hoppie | 192/2 |
| 4,257,145 | 3/1981 | Bovino | 425/352 |
| 4,305,489 | 12/1981 | Hoppie | 192/4 A |
| 4,310,079 | 1/1982 | Hoppie | 192/4 A |
| 4,319,655 | 3/1982 | Hoppie | 180/165 |
| 4,333,553 | 6/1982 | Hoppie | 180/165 |

Primary Examiner—Willard E. Hoag
Attorney, Agent, or Firm—C. H. Grace; P. S. Rulon

[57] ABSTRACT

A molding process for molding an elongated elastomeric member (60) with wire mesh sleeves (16) bonded to the ends (14). A molding preform (10) of elastomeric material is positioned within a seamless mold cylinder (26), and the open ends of the wire mesh sleeves (16) are mounted to end plug assemblies (30) slidably received into the mold cylinder (26) and positioned against the ends (14) of the preform (10). A specialized profile is formed into surfaces (44) of the respective end plug assemblies (30) and by heating of the mold (26), the ends (14) of the elastomeric preform (10) are molded to the profile, as well as bonded to the reinforcing wire mesh sleeves (16). Vacuum is applied to the interior of the mold to draw outgassing vapors through relief spaces therethrough. The completed elastomeric member (60) is removed from the mold cylinder (26) by stretching, the consequent reduction in diameter enabling ready separation from the mold cylinder (26) and removal thereof.

7 Claims, 9 Drawing Figures

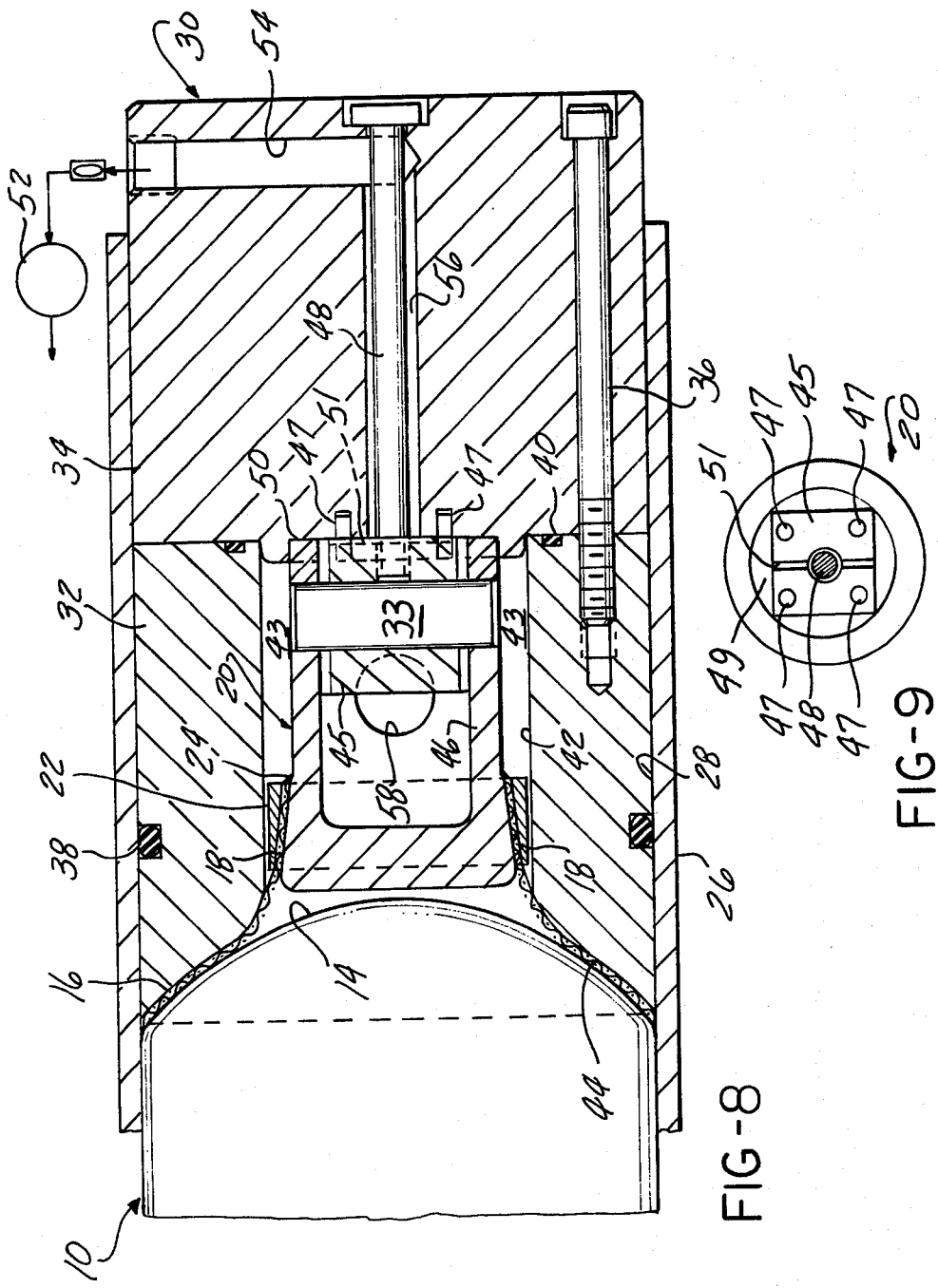

METHOD FOR MAKING AN ELASTOMERIC MEMBER WITH END PIECES

GOVERNMENT RIGHTS STATEMENT

The United States government has rights to this invention pursuant to Contract W-7405-ENG-48 awarded by the U.S. Department of Energy and Subcontract 2617509 awarded by the University of California, Lawrence Livermore Laboratory.

BACKGROUND OF THE INVENTION

This invention concerns a molding apparatus and method and, more particularly, a method of molding an elastomeric member of generally elongated shape, and having wire mesh reinforcing sleeves molded into the ends of the member, the ends having a shape which conforms to a specialized profile.

There has heretofore been proposed and described energy storage devices for regenerative braking systems which involve the use of torsionally stressed elongated elastomeric members to store the mechanical energy normally dissipated in the braking of vehicles.

Such system and devices are described in U.S. Pat. Nos. 4,246,988; 4,305,489; 4,310,079; and 4,319,655. In order to improve the energy storage capacity and fatigue life of the elastomeric member, there is disclosed in U.S. Pat. No. 4,333,553 an arrangement whereby the elastomeric member or members are prestressed under tension in order to reduce the tendency for knotting under high torsional stresses. Such prestressing involves considerable elongation of the elastomeric member over its relaxed state.

As described in co-pending application, Ser. No. 469,618, filed on 2/25/83, and assigned to the same assignee as the present application, it is highly desirable that the stretched elastomeric member have a substantially uniform diameter in order that the member may be disposed within a minimum diameter housing in the interest of conserving space.

There is described in the aforementioned copending application, a configuration of the elastomeric member in which this is achieved in a simple but effective manner.

This arrangement involves a particular profiling of the ends of the elastomeric member and also involves the molding of wire mesh sleeves into the ends of the elastomeric member.

The elastomeric members are subjected to relatively high torsional stresses; and for use in regenerative braking systems, the service life of the elastomeric member is an important consideration since many thousands of cycles of torsional stressing should desirably be able to be undergone without failure.

It has been found that any aberrational feature on the surface of the member produces an undesirable stress concentration, tending to lead to early fatigue failure of the member in service.

Several of such irregularities or aberrational features may be created during the process of molding the elastomeric member.

The elastomeric member for such applications has advantageously involved the use of a natural rubber compound or synthetic having similar properties which is molded into its final shape by application of pressure and heat while being confined within a mold cavity.

The traditional art of molding involves the use of split mold halves, with a central sprue or series of sprues, and often a series of relief ports.

The expansion of rubber material into a sprue opening or a mold seam and/or the shrinkage of material after cooling produces surface protuberances or depressions which act as stress concentrators.

In addition, the use of a split compression-type mold does not ensure full fill of the mold cavity, also creating the possibility of surface voids.

The elimination of such surface features as by conventional molding techniques has been difficult to achieve.

DISCLOSURE OF THE INVENTION

The present invention comprises a relatively simple but effective molding process and apparatus for the formation of elongated elastomeric members having a surface free from such defects, which is readily adapted to the manufacture of an elastomeric member assembly with reinforcing sleeves or wire mesh molded or bonded into each end of the elastomeric member, which ends may be shaped to a particular profile.

This method utilizes a seamless molding tube or cylinder which receives an uncured slug or preform of the elastomeric material such as a natural rubber compound or similar synthetic.

A pair of end plug assemblies are inserted from each end of the cylinder to enable compression of the preform as heat is applied through the walls of the mold cylinder to provide a curing and molding of the preform into its final molded shape and cured condition.

Each of the end plugs is adapted to have mounted thereto end piece assemblies, to which are secured a respective one of the reinforcing wire mesh sleeves.

The sleeves are partially flared prior to insertion into the mold. A profiled shaping surface is also formed on the inside surface of each end plug against which the wire mesh sleeves are expanded, the end plug surface being configured in the shape of the desired final profile of the ends of the elastomeric member to be molded.

Upon insertion of the end plugs and application of a compressing force, the preform is forced into the wire mesh sleeves, expanding each of these into tight contact with the shaping surface of the end plugs. Upon continued application of the compression and heating of the mold during the molding process, the ends of the preform and the wire mesh sleeve are molded together and into conformity with the desired profile.

In order to eliminate air within the mold and the outgassing vapors released during the molding procedure, a vacuum is applied through a passage extending into each end plug. Clearance spaces are provided such that outgassing may migrate to the ends of the elastomeric member during the molding process to be drawn off by the vacuum source.

The seamless interior of the mold cylinder eliminates parting seams and/or any tendency of the formation of a mold "flash". The absence of sprues or vent openings eliminates surface dimples or protuberances. The arrangement of the end plugs forced into the mold cylinder ensures that the mold cavity defined by the molding cylinder and end plugs clearance space will be completely filled to, in turn, ensure a smooth outer contour of the molded elastomeric member.

The completed elastomeric member assembly with the reinforcing sleeves and end pieces is removed from the mold by separating the end pieces and the wire mesh sleeves through the application of a stretching tension. This reduces the diameter of the elastomeric member and separates the molded member from the mold to allow ready removal from the mold cylinder.

DESCRIPTION OF THE DRAWINGS

FIG. 8 depicts, in partial section, the one end of the assembled cylinder mold end plugs and elastomeric member assembly components with a diagrammatic representation of the vacuum source and sight glass associated therewith.

FIG. 9 is a reduced size endwise view of the end piece and plug assembly shown in FIG. 8.

DETAILED DESCRIPTION

Figure 1:
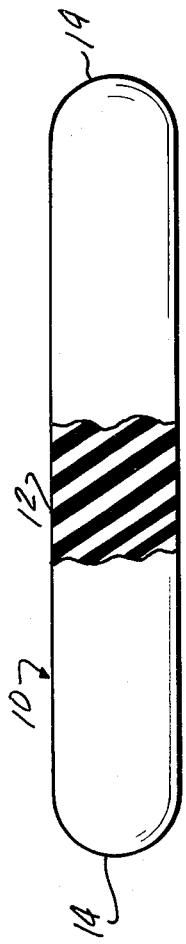
FIG. 1 is a view in partial section of an extrusion preform of elastomeric material.

According to the concept of the present invention, and as indicated in FIG. 1, a preform 10 of uncured elastomeric material such as a natural or synthetic rubber compound, is provided by an elongated extrusion having a uniform diameter body section 12 and each of the ends 14 being configured with a rounded or tapering shape.

Figure 2:
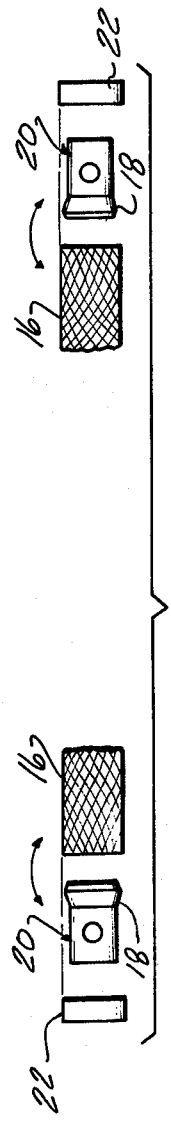
FIG. 2 is an exploded view of the end piece construction together with the wire mesh reinforcing sleeves.
Figure 3:
FIG. 3 is a view of the completed assembly of end pieces and reinforcing wire mesh sleeves.

In the second step, shown in FIGS. 2 and 3, rigid end piece assemblies 17 and reinforcing wire mesh sleeves 16 to be molded to each end of the elastomeric member are assembled together.

This is accomplished by a wire mesh sleeve 16 being positioned over a tapering surface 18 on inner end piece 20 of an end piece assembly (see FIG. 8).

The second component of each end piece assembly 17 comprises a collar 22 having an internally tapered surface which corresponds to tapered surface 18 on the inner end piece 20.

Upon positioning of the collar 22 over the end of the reinforcing sleeve 16, the sleeve 16 is securely retained thereon, for example, with a braze 24, as seen in FIG. 3, completing the assembly.

The free or open end of the wire mesh sleeve 16 is then flared at least slightly in order to be engaged and further expanded by the ends 14 of the preform 10.

Figure 4:
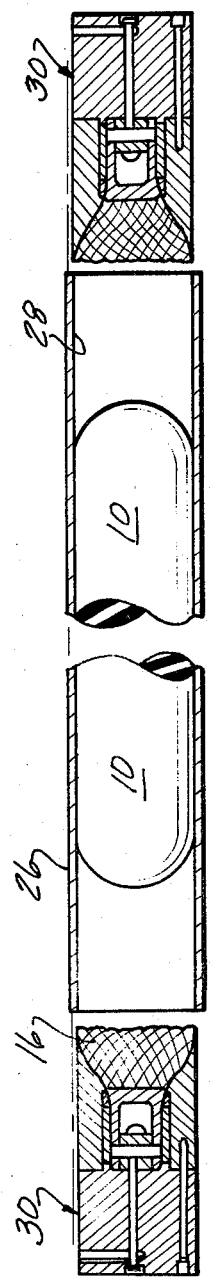
FIG. 4 is a view of a cylinder mold into which is positioned the elastomeric preform depicting the end plugs, end pieces, and wire mesh sleeves assembled together positioned for insertion into the cylinder mold.
Figure 5:
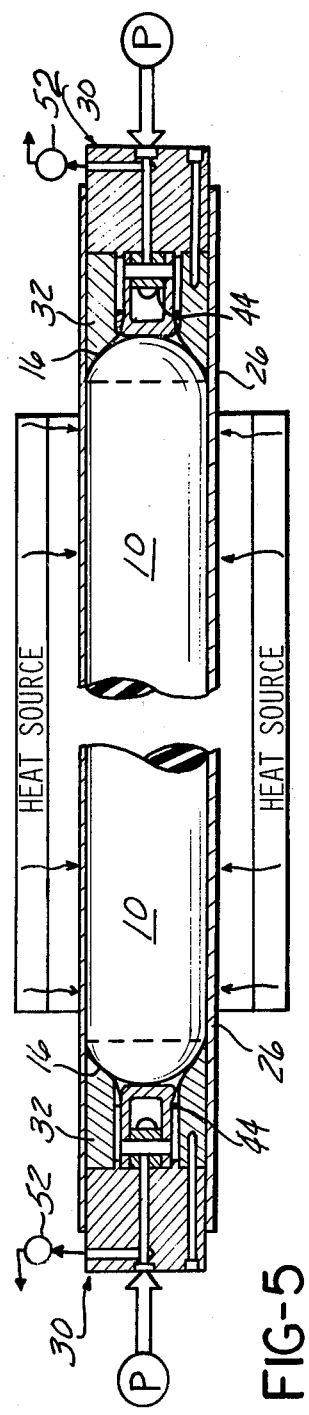
FIG. 5 depicts the assembled mold components and preform with a diagrammatic representation of the compression and heating of the mold assembly.

In the next stage, shown in FIGS. 4 and 5, the preform 10 is installed in the interior of a seamless mold cylinder 26 of a length able to accommodate the full length of the preform 10 with a clearance space on either side thereof, with a relatively loose fit of the outside diameter thereof to enable ready positioning of the preform 10 in the interior bore 28 of the mold cylinder 26.

At the same time, the assembled end pieces 17 and cylindrical reinforcing wire mesh sleeves 16 are mounted to an end plug assembly 30.

Referring again to FIG. 8, the end plug assemblies 30 consist of two-piece construction, with an inner plug 32 and an outer plug 34 secured together by cap screws 36.

Both the inner plug 32 and outer plug 34 are cylindrical in configuration, having an outside diameter such as to be slidably fit within the bore 28 formed in the mold cylinder 26. A sealing "O" ring 38 is provided recessed within the inner plug 32, and gasket "O" ring 40 seals the interface between the mating surfaces of the inner plug 32 and the outer plug 34.

The inner end plug 32 is formed with a central bore 42 extending into its inside face, which face is formed with an outwardly diverging profiled surface 44 which is in conformity with the desired final profile of the transition sections of the elastomeric member assembly as described in detail in the above referenced co-pending patent application.

A clearance space between the collar 22 and bore 42 allows bypass flow of outgassing vapors, as will be described.

Each of the free ends of the wire mesh sleeves 16 projects axially into the region of the profile surface 44 such as to be able to be expanded against the surface 44 thereof at assembly of the mold and other components, and during the molding process. The assembly of the reinforcing sleeve 16 and end piece assemblies 30 to the end plugs is accomplished by a square-shaped retainer member 45 slidably interfit into an interior bore 46 of the end piece component 20. A cross-pin 33 is provided to retain the same therein. The retainer member 45 is doweled at 47 to the inside face 50 of the outer plug 34. A capscrew 48 is provided which draws the retainer plug 45 against the inside face 50 of the outer plug 34 such as to securely locate the assembly of the reinforcing wire mesh sleeve 16 and end piece components with respect to the end plug assembly 30.

As shown in FIG. 5, the entire assemblage of the end plug assembly 30 and the wire mesh screen 16 is compressed as by use of a press forcing the free ends of the wire mesh sleeves 16 against the preform 10, expanding the same against the surface 44 of the inner plug 32.

The interior clearance spaces are evacuated by vacuum pumps 52 connected to cross passage 54 as seen in FIG. 8. A clearance space 56 around the central retainer capscrew 48 allows evacuation of the interior bore 46 via spaces 49 (FIG. 9) and slot 51. The interior bore 46, in turn, receives outflow from space 43 between the end piece assembly 20 and bore 42 by virtue of cross bore 58 which is also utilized in assembling the elastomeric member into an energy storage device as described in the co-pending application. Space 43, in turn, receives outflow from the space between surface 14 of the preform 10 by virtue of a clearance space between collar 22 and bore 42. Thus, air can be removed from the entire mold cavity prior to curing, and any outgassing vapors generated during the molding and curing process can be removed.

Accordingly, as indicated diagrammatically in FIG. 5, compression of the end plug assemblies 30, as with a press P, and the application of heat from a heat source along the length of the mold cylinder 26 will allow complete curing and molding of the preform 10 to be shaped into exact conformity with the surface 44, as well as producing a molding in or bonding of the wire mesh sleeves 16 into the ends of the elastomeric member.

It can be appreciated that the absence of sprue or vent holes and splits and seams in the mold cavity ensure the complete absence of dimples or flash or other aberrational features.

At the same time, the compression of the end plug assemblies 30 causes the mold cavity to be defined by the volume of material present in the mold cavity, such that full fill of the mold cavity is ensured.

Figure 6:
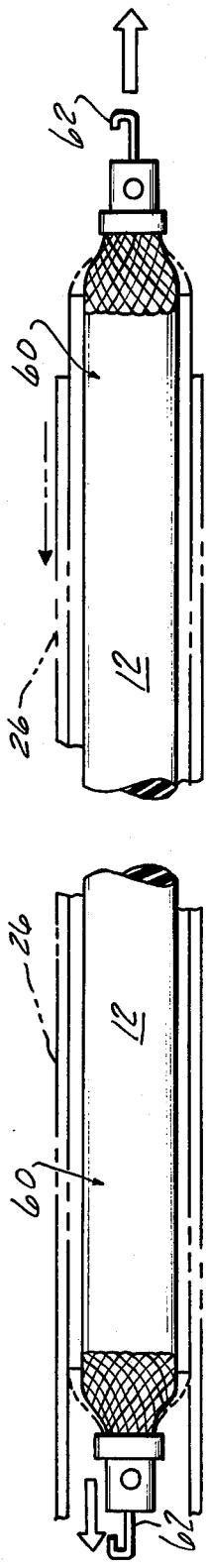
FIG. 6 is a diagrammatic representation of the stretching of the completed elastomeric member assembly for removal of the surrounding mold cylinder.

In order to remove the completed elastomeric member assembly 60, the end cap plug assemblies 30 are disassembled from the end pieces as shown in FIG. 6, and engagement hooks 62 threaded into the end of the retainer element 45 and a separating force applied thereto as indicated. The stretching and reduction in diameter of the body section 12 causes a break away of any adhesions between the exterior thereof and the interior of the mold cylinder 26. At the same time, this provides the necessary clearance for the removal of the mold cylinder as is also indicated diagrammatically.

Figure 7:
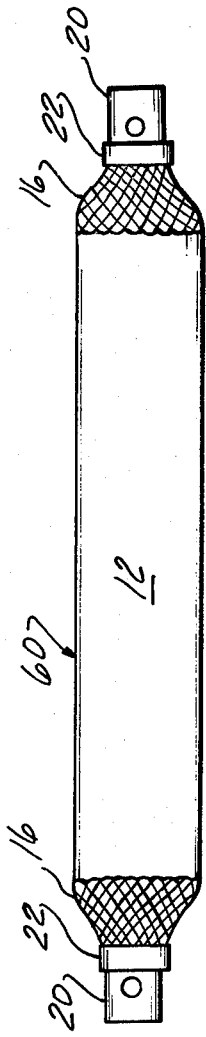
FIG. 7 depicts a transverse view of the completed elastomeric member assembly.

In FIG. 7, the relaxed completed assembly 60 is shown with the reinforcing mesh sleeve 16 molded into the transition sections on the ends of the main body section 12.

This then may be installed into the energy storage device as described in the co-pending application referenced above.

I claim:

1. A method of molding, curing, and attaching a meshed material of an end piece to an elongated elastomeric member, comprising the steps of:

disposing a preform comprising a curable elongated elastomeric member into a seamless cylinder of sufficient length to provide a clearance space on either end thereof;

positioning the end piece into one end of said cylinder with the meshed material in juxtaposition with one end of said preform;

positioning an end plug assembly within each end of said cylinder with said meshed material sandwiched between said one end of the preform and an adjacent surface of the associated end plug assembly;

compressing said end plug assemblies against said preform for molding and extruding elastomeric material of said elastomeric member into openings in the meshed material for attaching the meshed material to the elastomeric member; and curing the preform while the end plug assemblies are compressed against the preform.

2. The method according to claim 1 further including the step of initially evacuating the spaces between said end plug assemblies and said preform, and continuing to apply a vacuum to said spaces during said compressing and curing step to thereby eliminate outgassing vapors from said preform material during curing thereof.

3. The method of claim 1, wherein said one end of the preform has a predetermined shape, said meshed material is a wire mesh sleeve having a shape complimentary to the predetermined shape, and the adjacent surface of the associated end plug assembly has a shape complementary to the predetermined shape; and wherein said method further includes the step of:

supporting the wire mesh sleeve on the associated end plug assembly.

4. A method of molding, curing, and attaching a meshed material of end pieces to the end of an elongated elastomeric member, comprising the steps of:

disposing a preform comprising a curable elongated elastomeric member into a seamless cylinder of sufficient length to provide a clearance space on either end thereof;

positioning an end piece into each end of the cylinder with the meshed material of each end piece in juxtaposition the associated end of the preform;

positioning an end plug assembly within each end of said cylinder with the meshed material sandwiched between the end of the preform and an adjacent surface of the associated end plug assembly;

compressing said end plug assemblies against said preform for molding and extruding elastomeric material of said elastomeric member into openings in the meshed material for attaching the meshed material to the elastomeric member; and curing the preform while the end plug assemblies are compressed against the preform.

5. The method according to claim 4, further including the step of initially evacuating the spaces between said end plug assemblies and said preform, and continuing to apply a vacuum to said spaces during said compressing and curing step to thereby eliminate outgassing vapors from said preform material during curing thereof.

6. The method according to claim 5, wherein the ends of the preform have a predetermined shape, said meshed material is a wire mesh sleeve having a shape complementary to the preform ends, and the adjacent surfaces of the end plug assemblies having a shape complimentary to the predetermined shape; and wherein said method further includes the step of:

supporting the mesh sleeves on the associated end plug assemblies.

7. The method according to claim 4 further including the step of:

stretching said molded elastomeric member after the curing step by applying a separating force to the end pieces to reduce the diameter of the elastomeric member and to enable removal from said mold cylinder.

* * * * *